A. J. SCHOENBEIN.
AUTOMATIC GEAR SHIFTING MECHANISM.
APPLICATION FILED DEC. 29, 1916.
1,279,768. Patented Sept. 24, 1918.
3 SHEETS—SHEET 1.
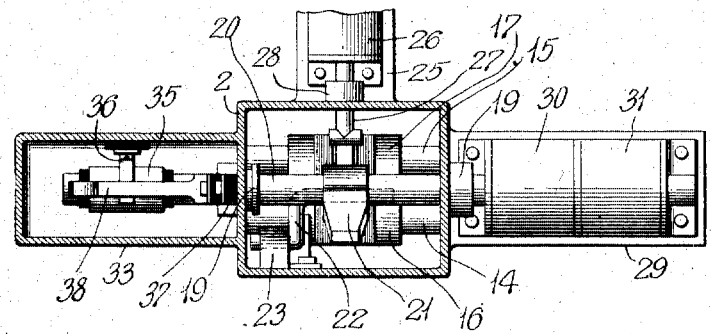
Fig. 2.
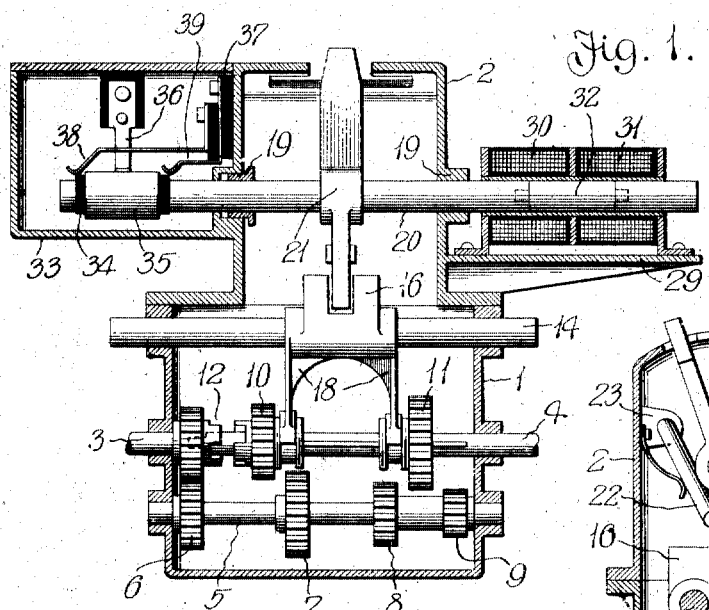
Fig. 1.
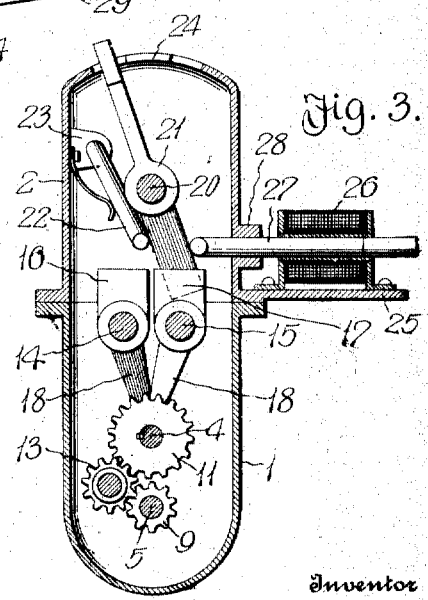
Fig. 3.
Fig. 4.
Witness
Chas. W. Stauffiger
Axel H. Butler
Inventor
Albert J. Schoenbein
By Barthel & Barthel
Attorneys

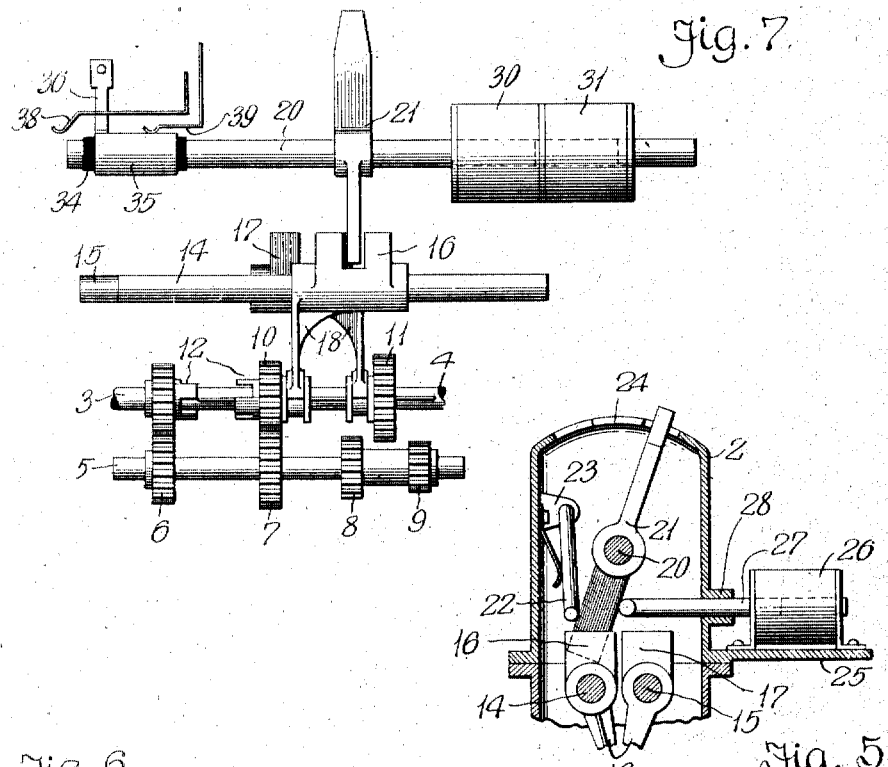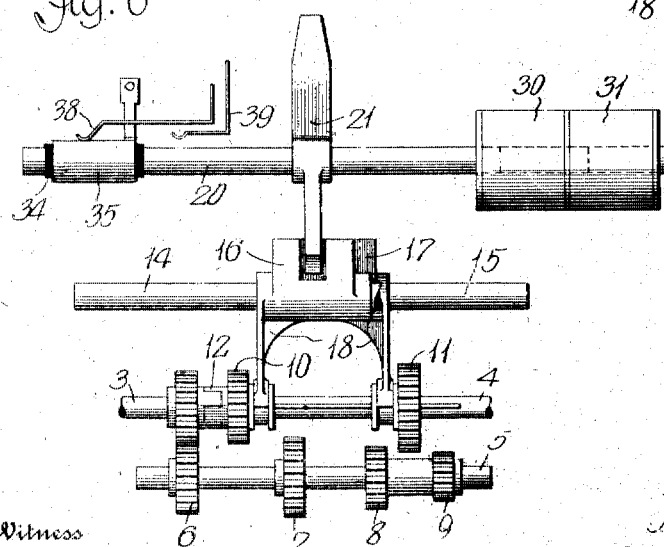

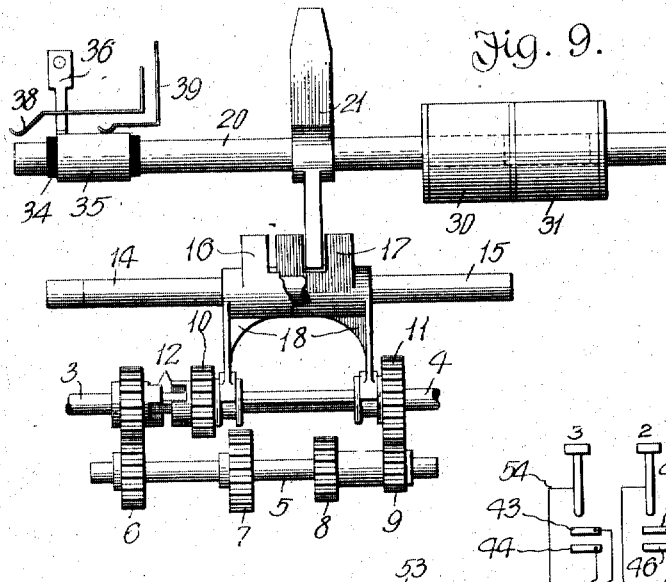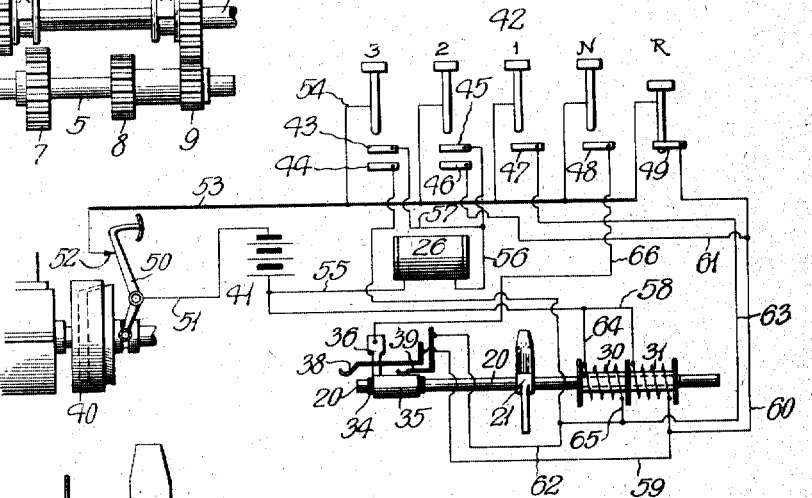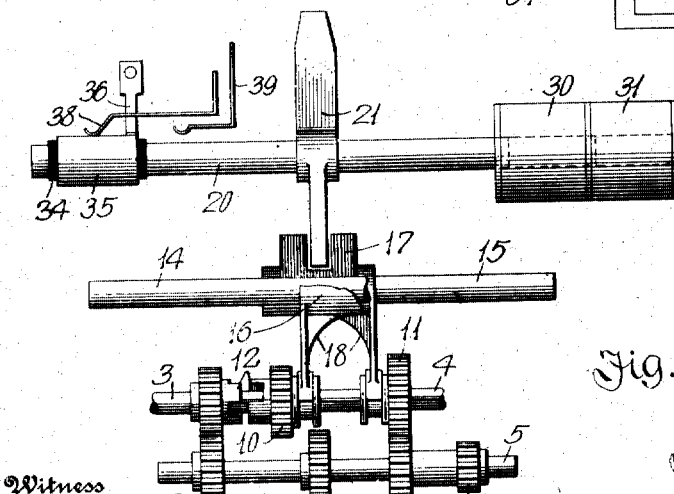

UNITED STATES PATENT OFFICE.

ALBERT J. SCHOENBEIN, OF FORT WAYNE, INDIANA.

AUTOMATIC GEAR-SHIFTING MECHANISM.

1,279,768.    Specification of Letters Patent.    Patented Sept. 24, 1918.

Application filed December 29, 1916.   Serial No. 139,657.

*To all whom it may concern:*

Be it known that I, ALBERT J. SCHOENBEIN, a citizen of the United States of America, residing at Fort Wayne, in the county of Allen and State of Indiana, have invented certain new and useful Improvements in Automatic Gear-Shifting Mechanism, of which the following is a specification, reference being had therein to the accompanying drawings.

This invention relates to an automatic gear shifting mechanism, and has particular reference to certain improvements in connection with the gear shifting mechanisms disclosed by an application filed Aug. 24, 1916, Serial No. 116,705, and another application filed September 1st, 1916 Serial No. 118,008.

The particular improvement herein disclosed is in the simplification of construction, the dispensing with certain elements, while retaining the respective functions thereof, and the substitution and modification of certain other features and elements which reduce the cost of construction and increase the durability and efficiency of the automatic gear shifting mechanism.

My improved construction will be hereinafter described and then claimed, and reference will now be had to the drawings, wherein—

Figure 1 is a vertical sectional view of an automatic gear shifting mechanism in neutral position;

Fig. 2 is a plan of a portion of the mechanism with the casing in horizontal section;

Fig. 3 is a vertical sectional view of the gear shifting mechanism in neutral position;

Fig. 4 is a plan of a portion of the mechanism, showing an H plate;

Fig. 5 is a vertical sectional view of a portion of the gear shifting mechanism, showing the main gear shifting arm in second or third position;

Fig. 6 is a side elevation of a portion of the mechanism in third position;

Fig. 7 is a similar view of the mechanism in second position;

Fig. 8 is a similar view of the mechanism in first position;

Fig. 9 is a similar view of the mechanism in reversed position, and

Fig. 10 is a diagrammatic view of the gear shifting mechanism in reverse position and illustrating electrical devices and connections thereof.

Throughout the drawings, the reference numerals 1 and 2 denote superposed communicating casings, the former being of the ordinary construction and the latter especially designed as part of my invention. The casing 1 provides an inclosure for an ordinary change speed gear mechanism including an engine shaft 3, a drive shaft 4, a countershaft 5, a train of gears 6 between the engine shaft 3 and the countershaft 5; second, first and reverse gears, 7, 8 and 9 respectively, on the countershaft 5, shiftable gears 10 and 11 on the drive shaft 4, a clutch 12 between the engine shaft 3 and the shiftable gear 10 and the drive shaft 4, and a rotatable reverse gear 13 associated with the reverse gear 9 of the countershaft 5. The casing 1 also supports parallel rods 14 and 15 for bifurcated or slotted gear shift members 16 and 17 respectively, said members extending upwardly into the casing 2. The members 16 and 17, have forks 18, the fork of the gear shift member 16 disposed for shifting the gear 10 and the fork of the gear shift member 17 disposed to shift the gear 11.

The casing 2 is provided with longitudinal alining bearings 19 for a longitudinal shaft 20 adapted to be reciprocated and rocked or oscillated. Mounted on the shaft 20 within the casing 2, is a main gear shifting arm 21 and the lower end of said arm is normally held in the bifurcation of the gear shift member 17 by a pivoted spring pressed arm 22 carried by a bracket 23 forming part of the casing 2. The upper end of the arm 21 protrudes into an H shaped slot 24 in the top of the casing 2, so that it may be manually shifted should occasion require. By reference to Fig. 4 of the drawing, it will be noted that the top of the casing has indicia to indicate gear positions.

A side wall of the casing 2 is provided with a bracket 25 for a solenoid 26, said solenoid having a core 27 extending through a bearing 28 of the casing 2 to engage the lower end of the arm 21, as best shown in Fig. 3. The core 27 is in opposed relation to the arm 22 and a portion of said core is non-magnetic while the remaining portion is of magnetic material, so that when the solenoid is energized, the core 27 will shift the lower end of the arm 21 into the bifurcation of the member 16 and when the solenoid is deënergized, the spring pressed arm 22 when assuming normal position will restore the core 27 to normal position. The solenoid 26 constitutes means or an electrical device for rocking or oscillating the shaft 20, in conjunction with the arm 22, so that the lower end of the gear shifting arm 21 will either occupy a first speed and reverse position or a second and third speed position.

An end wall of the casing 2 has a bracket 29 and on said bracket is a double solenoid consisting of windings 30 and 31 having a common core 32 forming part of the shaft 20, said shaft being of non-magnetic material with the core 32 interposed at one end thereof. The double solenoid constitutes means or an electrical device for reciprocating the shaft 20 in a desired direction and associated with the shaft 20 is an automatic switch controlling certain electric circuits.

The casing 2 has a housing 33 for that end of the shaft 20 opposite the core 32 and on the end of the shaft 20 within the housing 33 is an insulator 34 for a metallic sleeve 35. Normally contacting with the sleeve 35 is a brush 36 carried by and insulated from the wall of the housing 33. Another wall of the housing 33 is provided with insulators 37 for resilient contact fingers 38 and 39 adapted to be engaged by the sleeve 35, and in order that the operation of the mechanism may be clearly understood, as hereinafter set forth, it is well to bear in mind that the sleeve 35 cannot engage both of the contact fingers 38 and 39 at the same time.

Reference will now be had to Fig. 10 illustrating diagrammatically the gear shifting mechanism associated with a clutch 40, a suitable source of electrical energy, as batteries 41, and a selector device 42. The selector device comprises a series of push buttons for reverse, neutral, first, second and third speed positions and as such will be hereinafter referred to. Associated with the third speed button are contacts 43 and 44, with the second speed button contacts 45 and 46, with first speed button a single contact 47, with the neutral button a single contact 48, and with the reverse button a single contact 49. Before any circuits can be established by the selector buttons, it is necessary that the clutch 40 be thrown out to prevent clashing or breaking speed gears, so, the clutch pedal 50 has been included in the electric circuit and is connected by a wire 51 to the batteries 41. With the clutch pedal 50 depressed and the clutch out, said clutch pedal engages a contact 52 connected to a bus bar 53 and said bus bar has a connection 54 with each of the selector buttons.

Other electrical connections are as follows:

The solenoid 26 is connected by a wire 55 to the batteries 41 and by wires 56 and 57 to the contacts 45 and 43 respectively.

The winding 31 of the double solenoid is connected by a wire 58 to the battery 41 and by a wire 59 to the contact finger 38. The wire 59 is connected by wires 60 and 61 to the contacts 49 and 46 respectively.

The contact 44 of the third speed button is connected by a wire 62 to the contact finger 39 and said wire is connected by a wire 63 to the contact 47 of the first speed button.

The winding 30 of the double solenoid is connected by a wire 64 to the wire 58 leading to the batteries 41 and by a wire 65 to the wire 63 leading to the contact 47.

The contact 48 of the neutral button is connected by a wire 66 to the brush 36 of the switch.

Operation:—Assuming that the gears of the change speed transmission mechanism are in neutral position and it is desired to shift the gears for a reverse position, the clutch 40 is thrown out and the reverse button of the selector device pressed to engage the contact 49. The following circuit is established: from batteries 41 by wire 51 to the clutch pedal 50, contact 52 to the bus bar 53 and reverse button. From contact 49 by wire 60 to the winding 31 of the double solenoid and then by wire 58 to the batteries 41. That part of the solenoid formed by the winding 31 is energized, and the shaft 20 is reciprocated, causing the lower end of the arm 21 to shift the member 17 and move the gear 11 to the reverse gears 9 and 13.

Another example: Supposing the gears are in neutral position and it is desired to shift the same to second speed. The clutch 40 is thrown out and the second speed button of the selector device is pressed to successively engage the contacts 45 and 46. The first circuit established is as follows:— battery 41 by wire 51 to clutch pedal 50, contact 52 to the bus bar 53 and second speed button of the selector device, from contact 45 by wire 56 to the solenoid 26 and then by wire 55 to the batteries 41. The solenoid 26 is energized and the core 27 thereof is projected farther into the casing 2 to move the lower end of the arm 21 out of the bifurcation of the member 17 and into the bifurcation of the member 16. The arm 21 is now in position to shift the member 16 either for second speed or third speed, but as second speed was selected, another circuit is established in connection with the contact 46, and the circuit is as follows:—batteries 41 by wire 51 to clutch pedal 50, contact 52 to bus bar 53 and second speed button of the selector device, contact 46 by wires 61 and 60 to the winding 31 of the double solenoid and then by wire 58 to the batteries 41. In this manner the solenoid 26 is energized in advance of reciprocating the shaft 20 and when the member 16 is shifted the gear 10 is moved into mesh with the second speed gear 7.

Before first, second, third or reverse positions can be obtained, it is necessary to always bring the gears to neutral position, and as the shaft 20 may gain some momentum when being reciprocated, it is apparent that the sleeve 35 will first engage one contact finger and then the other, thus causing the windings 30 and 31 of the double solenoid to be alternately and temporarily energized until the shaft 20 is brought to a neutral position with the sleeve 35 of said shaft intermediate the contact fingers 38 and 39.

What I claim is:—

1. In an automatic gear shifting mechanism, an arm adapted for changing the gears of a change speed mechanism, a shaft supporting said arm, a solenoid adapted to be energized to oscillate said arm in one direction, means maintaining said arm normally in position to be oscillated by said solenoid, and a double solenoid adapted to be energized to reciprocate said shaft.

2. In an automatic gear shifting mechanism, an arm adapted for changing the gears of a change speed mechanism, a shaft supporting said arm, a solenoid adapted to be energized to oscillate said arm, means opposed to said solenoid maintaining said arm normally neutral, and a double solenoid adapted to be energized to reciprocate said shaft.

3. In an automatic gear shifting mechanism, the combination with a source of electrical energy, a clutch pedal, and a selector device adapted for circuits with said clutch pedal, and said source of electrical energy, of an arm adapted for changing the gears of a change speed mechanism, a shaft supporting said arm, a solenoid adapted to be placed in one of the circuits by said selector device to oscillate said arm for a predetermined gear position, means maintaining said arm normally in position to be oscillated by said solenoid, and a double solenoid having windings either of which may be placed in a circuit by said selector device to reciprocate said shaft in a predetermined direction.

4. In an automatic gear shifting mechanism, the combination with a source of electrical energy, a clutch pedal, and a selector device adapted for circuits with said clutch pedal and said source of electrical energy, of an arm adapted for changing the gears of a change speed mechanism, a shaft supporting said arm, a solenoid adapted to be placed in one of the circuits by said selector device to oscillate said arm for predetermined gear positions, means constantly in contact with said arm adapted for maintaining said arm normally in position to be oscillated by said solenoid, and a double solenoid having windings either of which may be placed in a circuit by said selector device to reciprocate said shaft in a predetermined direction.

5. In a gear shifting mechanism, the combination with a source of electrical energy, a clutch pedal, and a selector device adapted for circuits with said clutch pedal and said source of electrical energy, of an arm adapted for changing the gears of a change speed mechanism, a shaft supporting said arm, a solenoid adapted to be placed in one of the circuits by said selector device to oscillate said arm for predetermined gear positions, means maintaining said arm normally in position to be oscillated by said solenoid, a double solenoid having windings either of which may be placed in a circuit by said selector device to reciprocate said shaft in a predetermined direction, and a switch in circuit with said double solenoid including said shaft as a part thereof for alternately establishing circuits in connection with said double solenoid to restore said shaft and the arm thereof to neutral position.

6. In an automatic gear shifting mechanism, the combination with a source of electrical energy, a clutch pedal, and a selector device adapted for circuits with said clutch pedal, and said source of electrical energy, of a shaft adapted to be rocked and reciprocated to effect a change in the gears of a change speed mechanism, an electrical device adapted to be placed in one of said circuits by said selector device to rock said shaft in one direction, means adapted to rock said shaft in the opposite direction, and an electrical device adapted to be placed in other of the circuits by said selector device to reciprocate said shaft in a predetermined direction.

7. In an automatic gear shifting mechanism, the combination with a source of electrical energy, a clutch pedal and a selector device adapted for circuits with said pedal and said source of electrical energy, of a shaft adapted to be rocked and reciprocated to effect a change in the gears of a change speed mechanism, an electrical device adapted to be placed in one of said circuits by said selector device to rock said shaft, means adapted to hold said shaft in position to be rocked by said electrical device, an electrical device adapted to be placed in other of the circuits by said selector device to reciprocate said shaft in a predetermined direction, and a switch in circuit with the last mentioned electrical device and having as a part thereof said shaft and adapted to complete circuits in said last mentioned electrical device to restore said shaft to normal position.

In testimony whereof I affix my signature in the presence of two witnesses.

ALBERT J. SCHOENBEIN.

Witnesses:
K. D. FITCH,
F. ELMER SCHMÖR.